May 6, 1941.   F. KÖBER   2,240,703
PROJECTOR FOR STEREOSCOPIC PICTURES
Filed Feb. 16, 1939
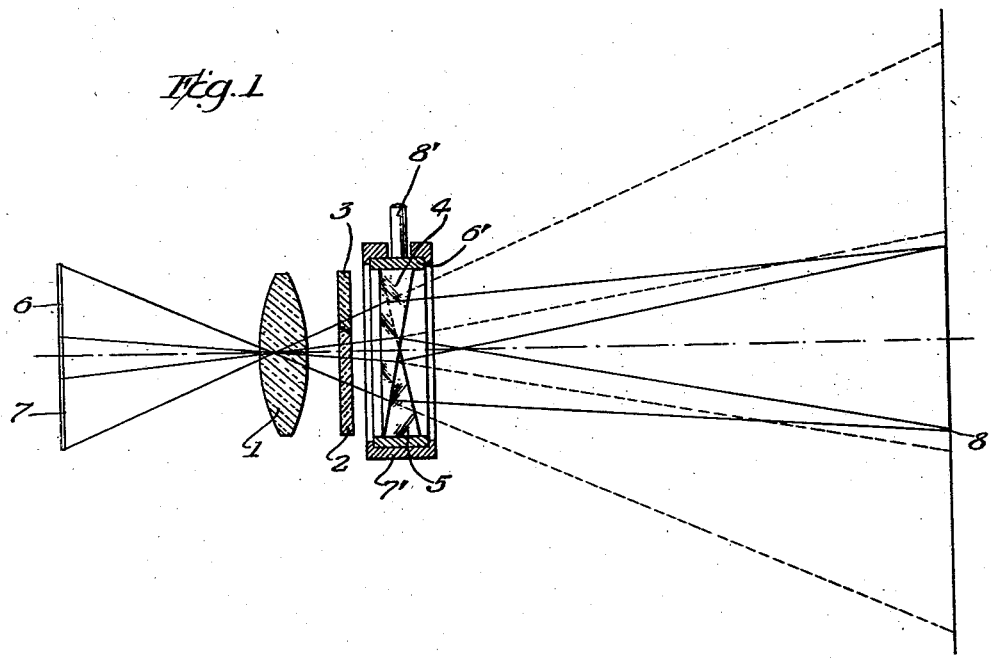
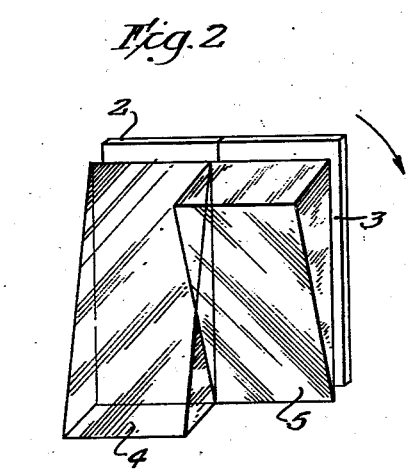
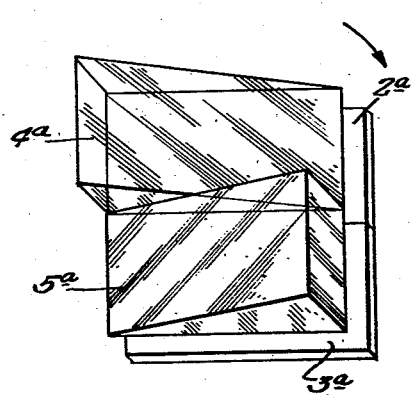
Inventor:
Fritz Köber Patented May 6, 1941

2,240,703

UNITED STATES PATENT OFFICE 2,240,703

PROJECTOR FOR STEREOSCOPIC PICTURES

Fritz Köber, Dresden, Germany, assignor to Zeiss Ikon Aktiengesellschaft, Dresden, Germany Application February 16, 1939, Serial No. 256,689
In Germany February 22, 1938

4 Claims. (Cl. 88—16.6)

The invention relates to improvements in projectors for stereoscopic pictures, and in particular is directed to projectors employing a single projection objective whose light emitting aperture is subdivided in two halves, each of which projecting one image of the pair of pictures occupying the picture window.

In projecting devices of this type it is well known to subdivide the light beam emitted by the objective by two filters arranged in a single plane in front of the objective. The filters which are employed permit only the passage of light rays in planes which are at an angle to each other. Preferably, polarizing filters of the foil type with their polarizing planes arranged at a right angle to each other are employed for this purpose. It is, however, difficult in projecting devices in the prior art to produce during the projection a variation of the convergence and/or an adjustment of the images in vertical direction. Such a variation of the convergence and/or adjustment of the images in vertical direction, however, is necessary, if the projected stereo pictures are to create in the eyes of the observer the same impression as are created by natural objects in both eyes of the observer.

It is an object of the invention to overcome the difficulties above mentioned by means of the optical wedges or prisms, which customarily are provided in devices of this type for bringing the pair of images produced from the stereo picture in superposition on the screen. In accordance with the invention, these optical wedges or prisms, which preferably are achromatic, are employed for varying the convergence and also for adjusting the images in vertical direction. This is accomplished in such manner, that the optical wedges, of which usually two are provided, are rotatably adjusted in unison about the optical axis in a plane at a right angle to said axis.

In the accompanying drawing, which illustrates the invention:

Figure 1 is a diagrammatic view of the arrangement of the optical elements of the stereo picture projector.

Figure 2 is a perspective front view of the optical wedges mounted in front of the projection objective, and Figure 3 is a similar view as Fig. 2 of a modification in that the optical wedges are arranged in a manner to deflect the images in horizontal direction.

Referring to Fig. 1, the projection objective is illustrated by a lens 1 in front of which are mounted in a single plane two polarizing filters 2 and 3, each covering one half of the aperture of the lens 1 and having their polarizing planes positioned at a right angle to each other. In front of the filters 2 and 3 are mounted the deflecting wedges 4 and 5 respectively, for deflecting the images produced from the pair of pictures 6, 7 in superposition on the screen 8. The light rays which pass through the stereoscopic pictures 6, 7 and through the lens 1, the filters 2, 3 and the wedges 4, 5 to the screen and form a composite image thereon are indicated by fine solid lines. The fine dotted lines indicate the light rays producing the secondary images. The optical wedges 4, 5 are mounted fixedly in an annular member 6' rotatable in a mount 7' and provided with a handle 8' or the like, for adjusting the pair of wedges 4, 5 rotatably with respect to the filters 2, 3.

Fig. 2 illustrates an arrangement of the optical wedges 4 and 5 in which the direction of deflection lies in a vertical plane. If the pair of wedges 4, 5 is rotatably adjusted, for instance in clockwise direction as indicated by the arrow, the prevailing geometrical conditions will produce during such a rotation of the wedges a greater displacement of the two images in horizontal direction than in vertical direction, or in other words, there will be produced the desired convergence variation. The displacement of the images in vertical direction, which also occurs is neglectible, the more so as the required rotative adjustment for the necessary convergence is very small only.

Fig. 3 illustrates a modification of the arrangement of the optical deflecting wedges. In this modification the direction of deflection of the optical wedges 4ª and 5ª, owing to the position of the pair of pictures to be projected, is horizontal. The polarizing filters in this modification are designated with 2ª and 3ª. In this modification the rotative adjustment of the optical wedges 4ª and 5ª is not employed for a variation of the convergence, but for a compensation of the difference of the images in vertical direction. When the two optical wedges 4ª and 5ª are rotatably adjusted simultaneously, for instance in clockwise direction, as indicated by arrow, there will be produced a greater displacement of the images in vertical direction than in horizontal direction. Such an adjustment of the images in vertical direction is necessary, because the projection of the pair of pictures very often is accompanied by a slight displacement of the images in vertical direction which should be compensated for, since the eyes of the observer are not able to adjust themselves to the required degree.

What I claim is:

1. In an optical system for projecting stereoscopic pictures, a projection objective, two polarizing filters in front of said objective and covering each one half of the aperture of the same, the polarizing planes of said filters being positioned at an angle with respect to each other for polarizing the beam of light emitted by said objective differently, each of said polarizing filters being associated with one of the pair of pictures to be projected, two optical wedges in front of said polarizing filters for deflecting the beams of light passing through each said filters in a manner to project the images of said pair of pictures in superposition on a screen, and means for rotatably adjusting said optical wedges in unison about the optical axis of said optical system.

2. In an optical system for projecting stereoscopic pictures, a projection objective, two polarizing filters in front of said objective and covering each one half of the aperture of the same, the polarizing planes of said filters being positioned at an angle with respect to each other for polarizing the beam of light emitted by said objective differently, each of said polarizing filters being associated with one of the pair of pictures to be projected, two optical wedges in front of said polarizing filters for deflecting the beams of light passing through each said filters in a manner to project the images of said pair of pictures in superposition on a screen, said optical wedges being positioned to deflect the polarized light rays entering the same in a vertical plane, and means for rotatably adjusting said optical wedges in unison about the optical axis of said optical system for varying the convergence of the pair of images.

3. In an optical system for projecting stereoscopic pictures, a projection objective, two polarizing filters in front of said objective and covering each one half of the aperture of the same, the polarizing planes of said filters being positioned at an angle with respect to each other for polarizing the beam of light emitted by said objective differently, each of said polarizing filters being associated with one of the pair of pictures to be projected, two optical wedges in front of said polarizing filters for deflecting the beams of light passing through each said filters in a manner to project the images of said pair of pictures in superposition on a screen, said optical wedges being positioned to deflect the polarized light rays entering the same in a horizontal plane, and means for rotatably adjusting said optical wedges in unison about the optical axis of said optical system for compensating a vertical displacement of the images produced from said pair of pictures.

4. In an optical system for projecting stereoscopic pictures, a projection objective, two polarizing filters in front of said objective and covering each one half of the aperture of the same, the polarizing planes of said filters being positioned at an angle with respect to each other for polarizing the beam of light emitted by said objective differently, each of said polarizing filters being associated with one of the pair of pictures to be projected, two optical wedges in front of said polarizing filters for deflecting the beams of light passing through each said filters in a manner to project the images of said pair of pictures in superposition on a screen, an annular member in which said two optical wedges are fixedly mounted, and a mount in which said annular member is rotatably supported so as to be rotatable about the optical axis of said optical system.

FRITZ KÖBER.